Sept. 13, 1927.

H. H. HILL 1,642,547

SHOCK ELIMINATOR AND SPRING CONTROL

Filed Sept. 29, 1926

Inventor
Homer H. Hill
By Frank and Boud
Attorneys

Patented Sept. 13, 1927.

1,642,547

UNITED STATES PATENT OFFICE.

HOMER H. HILL, OF CANTON, OHIO.

SHOCK ELIMINATOR AND SPRING CONTROL.

Application filed September 29, 1926. Serial No. 138,408.

The invention relates to devices for eliminating rebound shock in leaf springs of motor vehicles and the like, and for controlling the separation of the leaves of such springs during rebound; and the objects of the improvements are to provide a shock eliminator and spring control of a simplified and economical construction and arrangement, and adapted for application to springs of different leaf widths.

Preferred embodiments of the invention are illustrated in the accompanying drawing forming part hereof in which:—

Figure 1:
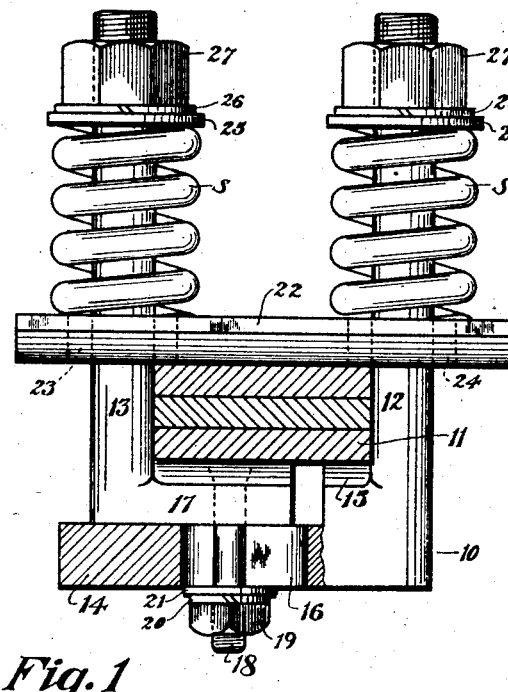
Figure 2:
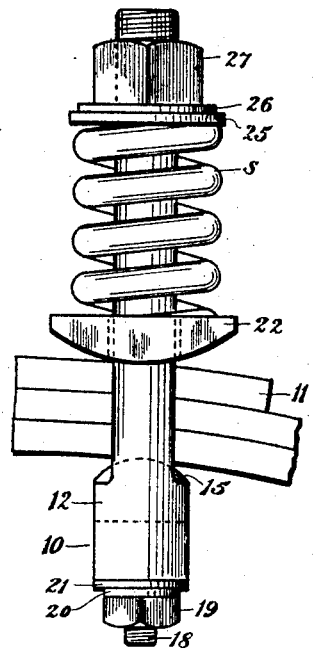
Figure 3:
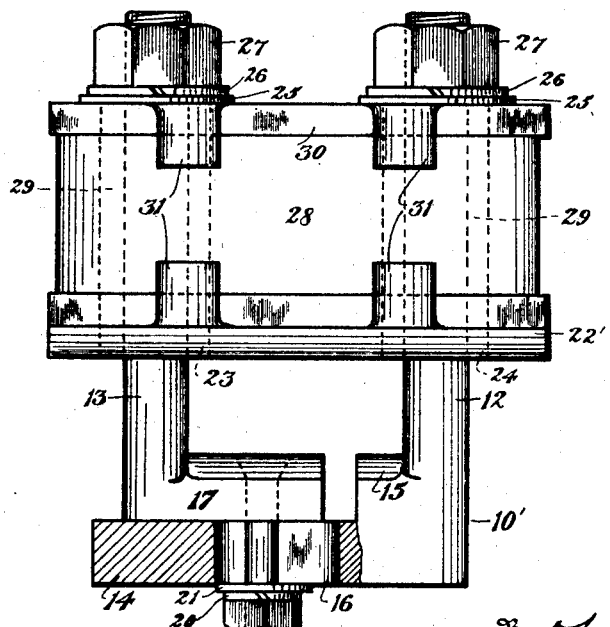

Figure 1 is a front elevation with portions in section of one form of the improved shock eliminator and spring control as applied to a leaf spring shown in section;

Fig. 2, a side elevation thereof, the leaf spring being shown in fragmentary side elevation; and Fig. 3, a front elevation with portions in section of a modified form of the device.

Similar numerals refer to similar parts throughout the several views.

One embodiment of the invention, illustrated in Figs. 1 and 2, and indicated generally at 10, includes a U yoke for fitting about the several leaves of a leaf spring as 11, the U yoke being adapted for application to leaf springs of varying widths and being made up of leg bolts 12 and 13. The bolt 12 has an angle head 14 laterally extending from one side thereof, and provided, adjacent the junction of the bolt and the head, with an offset curved bearing seat 15 for abutment against the outer surface of the lower spring leaf, as viewed in Figs. 1 and 2; and the head 14 is also provided with a laterally extending slot 16. The leg bolt 13 is likewise provided with a laterally extending angle head 17 having its outer surface adapted for abutment against the inner surface of the head 14, and the inner surface of the head 17 is curved to aline with the curved inner surface of the bearing seat 15 to provide alined bearing seats on the heads for abutment against the outer surface of the lower spring leaf.

A clamping bolt 18, preferably having a countersunk head, is secured in the yoke bolt head 17, and passes outwardly through the slot 16 in the head 14 for receiving the clamping nut 19 and suitable washers 20 and 21 for variably adjusting the distance between the yoke leg bolts 12 and 13 to accommodate the same to springs of varying widths.

The U yoke leg bolts 12 and 13, having been adjusted as aforesaid for the spring 11, extend snugly along each side thereof and beyond the upper leaf thereof, as illustrated in Figs. 1 and 2, for receiving the gripping bar 22 having spaced slots 23 and 24 therein for passing over the yoke leg bolts 12 and 13; the lower surface of the gripping bar 22, as viewed in Figs. 1 and 2, being curved for abutment against the outer surface of the upper spring leaf, and the upper surface of the gripping bar 22 providing a lower seat for the coiled compression springs S engirdling the bolts 12 and 13, the upper ends of the springs S being seated against suitable washers 25 and 26, and secured upon the bolt legs by means of nuts 27 screwed upon the threaded ends of each of the bolt legs 12 and 13 for securely resiliently clamping the device upon the leaf spring.

By this construction the shock eliminator and spring control may be placed upon a leaf spring of any desired width, and the springs S of the shock eliminator will absorb the rebound shock in the leaf spring due to normal use of the same upon a motor vehicle and the like, and the curved inner surface of the gripping bar 22 and the bearing seats of the yoke bolt angle heads provide for a rocking movement of the shock eliminator upon the sliding leaves of the leaf spring, and this rocking movement may be further or otherwise attained by enlarging the width of the slots 23 and 24 in the gripping bar 22.

The modified form of the invention illustrated in Fig. 3 and indicated generally at 10' is made up of parts which may be identical with the parts of the device illustrated in Figs. 1 and 2, excepting that instead of the coiled compression springs S, a resilient block 28 of rubber or the like and having slots 29 therein for passing over the yoke leg bolts 12 and 13 is provided for absorbing the rebound shock, and the resilient block 28 is preferably inserted between a lower modified form of gripping bar 22' and an upper bearing bar 30 each having lugs 31 extending therefrom for securing the resilient block 28.

I claim:

1. A shock eliminator and spring control for leaf springs and the like, including a U yoke having leg bolts for fitting about the several leaves of a leaf spring, each leg bolt having an angle head laterally extending from one side thereof, a laterally extending slot in one of the heads, means secured in the other head and extending through the slot for varying the distance between the leg bolts, a gripping bar having slots therein for fitting over the leg bolts, adjustable stop means and the like on the ends of the leg bolts, and resilient means between the leg bolt stop means and the gripping bar for yieldingly clamping the yoke and gripping bar about the leaf spring.

2. A shock eliminator and spring control for leaf springs and the like, including a U yoke having leg bolts for fitting about the several leaves of a leaf spring, means for varying the distance between the leg bolts, a gripping bar having a curved surface for bearing against an outer leaf of the leaf spring and slots in the gripping bar for fitting over the leg bolts, adjustable stop means and the like on the ends of the leg bolts, and resilient means between the leg bolt stop means and the gripping bar for yieldingly clamping the yoke and gripping bar about the leaf spring.

3. A shock eliminator and spring control for leaf springs and the like, including a U yoke having leg bolts for fitting about the several leaves of a leaf spring, each leg bolt having an angle head having a curved surface for bearing against one outer leaf of the leaf spring, a gripping bar having a curved surface for bearing against the other outer leaf of the leaf spring, slots in the gripping bar for fitting over the leg bolts, adjustable stop means and the like on the ends of the leg bolts, and resilient means between the leg bolt stop means and the gripping bar for yieldingly clamping the yoke and gripping bar about the leaf spring.

4. A shock eliminator and spring control for leaf springs and the like, including a U yoke having leg bolts for fitting about the several leaves of a leaf spring, each leg bolt having an angle head laterally extending from one side thereof, a laterally extending slot in one of the heads, means secured in the other head and extending through the slot for varying the distance between the leg bolts, a gripping bar having a curved surface for bearing against an outer leaf of the leaf spring and slots in the gripping bar for fitting over the leg bolts, adjustable stop means and the like on the ends of the leg bolts, and resilient means between the leg bolt stop means and the gripping bar for yieldingly clamping the yoke and gripping bar about the leaf spring.

5. A shock eliminator and spring control for leaf springs and the like, including a U yoke having leg bolts for fitting about the several leaves of a leaf spring, each leg bolt having an angle head laterally extending from one side thereof, a laterally extending slot in one of the heads, means secured in the other head and extending through the slot for varying the distance between the leg bolts, and each angle head having a curved surface for bearing against one outer leaf of the leaf spring, a gripping bar having a curved surface for bearing against the other outer leaf of the leaf spring, slots in the gripping bar for fitting over the leg bolts, adjustable stop means and the like on the ends of the leg bolts, and resilient means between the leg bolt stop means and the gripping bar for yieldingly clamping the yoke and gripping bar about the leaf spring.

In testimony that I claim the above, I have hereunto subscribed my name.

HOMER H. HILL.